C. R. DAVIS.
MANURE SPREADER.
APPLICATION FILED SEPT. 16, 1914.
1,177,391.
Patented Mar. 28, 1916.
2 SHEETS—SHEET 2.
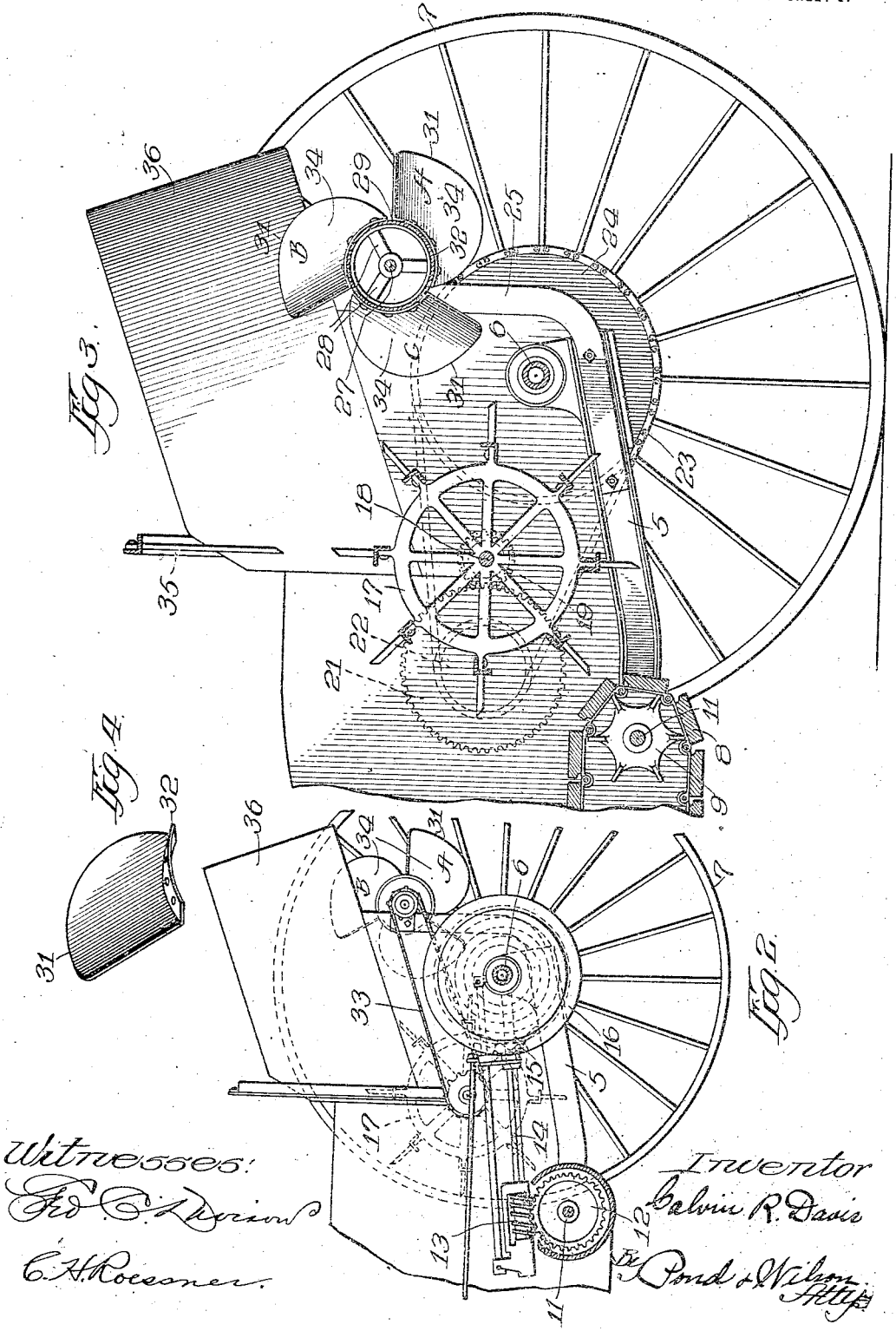

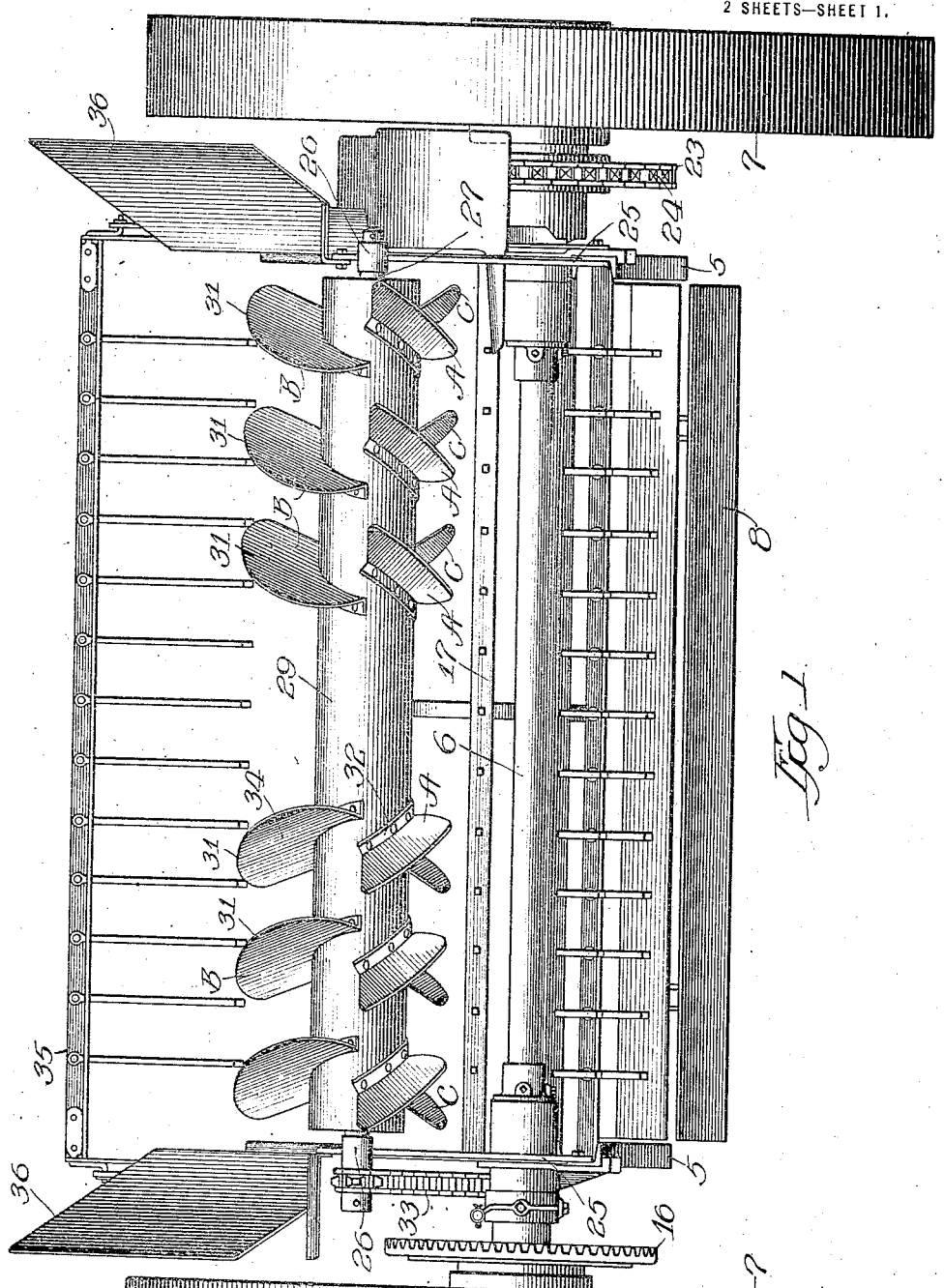

UNITED STATES PATENT OFFICE.

CALVIN R. DAVIS, OF CHICAGO HEIGHTS, ILLINOIS, ASSIGNOR TO EMERSON-BRANTINGHAM COMPANY, OF ROCKFORD, ILLINOIS, A CORPORATION OF ILLINOIS.

MANURE-SPREADER.

1,177,391.  Specification of Letters Patent.  Patented Mar. 28, 1916.

Application filed September 16, 1914. Serial No. 862,084.

*To all whom it may concern:*

Be it known that I, CALVIN R. DAVIS, a citizen of the United States, residing at Chicago Heights, in the county of Cook and State of Illinois, have invented certain new and useful Improvements in Manure-Spreaders, of which the following is a specification.

This invention relates in general to manure spreaders, and has more particular reference to the distributing mechanism by means of which the manure or fertilizer is distributed over the ground as the machine travels along.

One of the primary objects of my present invention is the provision of a novel and improved distributing device which, in conjunction with the usual delivery cylinder, will thoroughly and evenly distribute the manure from the machine over an area of greater width than the width of the machine.

Another object is to provide a distributing device which will satisfactorily distribute all kinds of manure or fertilizer, and will not clog or wind up with straw, marsh grass or corn stalks contained in the manure, but which is so constructed as to present no straight edges or sharp corners upon which straw, hay or corn stalks might catch, or about which they might wind; the device being so constructed as to present only curved surfaces and edges to the material being distributed.

A further object is to provide a distributing device having distributing blades of novel construction so arranged and positioned as to throw the material being spread laterally beyond the wheels of the machine, and also constructed so as to free themselves readily from the material and permit the material to be thrown and distributed freely without retention by the blades.

My invention and its mode of operation will probably be best understood by reference to the following description, when considered in connection with the accompanying drawings, throughout the various figures of which like reference characters refer to similar parts.

Referring to the drawings,—Figure 1 is a rear end view of a manure spreader embodying my invention; Fig. 2 is a fragmentary side elevation looking toward the right at the construction shown in Fig. 1; Fig. 3 is a longitudinal sectional view through the machine; and Fig. 4 is a detail perspective view of one of my improved distributing blades.

On the drawings, reference character 5 indicates a portion of the main frame of the machine, supported at its rear end upon a main shaft 6 carried by a pair of wheels 7. The front end of the machine (not shown) is supported upon wheels arranged in any well known or preferred manner. The bottom of the machine comprises an endless slatted conveyer 8 trained around a sprocket wheel 9 fixed on a shaft 11, upon which is mounted a worm wheel 12 adapted to be driven by a worm 13 carried on a shaft 14, which shaft is equipped at its other end with a bevel gear 15 adapted to mesh with and be driven by a companion gear 16 fixed on the main shaft 6.

A delivery cylinder 17, of well known construction, is mounted upon a shaft 18 rearwardly of and above the bottom conveyer 8, this delivery cylinder being driven in a clockwise direction viewing Fig. 3, through the instrumentality of a pinion 19 fixed on the shaft 18 and driven by a gear 21, which in turn is connected with a sprocket wheel 22 adapted to be driven by means of a chain 23 from a drive sprocket-wheel 24 fixed on the shaft 6, as shown in Fig. 1.

The mechanism thus far described may be of any well known or preferred construction, and the details thereof are not comprehended in my present invention.

It is desirable in order to secure the best results from the fertilizer applied to the land that it be finely divided and evenly distributed over the ground. It is also desirable to spread the manure over an area of greater width than the machine, so that fewer travels of the machine over the field will be necessary to cover the entire area with fertilizer. With these objects in view, I have devised an auxiliary distributing device, positioned rearwardly of and above the delivery cylinder, in position to receive the manure or fertilizer delivered by this cylinder and further disintegrate and finally deliver the manure rearwardly and laterally of the machine, so that it becomes finely distributed over an area greater in width than the machine. I have therefore equipped the rear end of the frame members 5 with upwardly-extending supporting members 25 carrying suitable bearings 26, in which a shaft 27 is journaled. This shaft extends transversely of the machine, as shown in Figs. 1 and 3, and has fixedly mounted thereon, by means of a plurality of spiders 28, a metal drum or cylinder 29, which forms the body of my improved distributing device. Upon the periphery of this drum, I have mounted a plurality of sets of distributing blades, designated generally by reference character 31. Each of these blades is constructed of metal and is substantially triangular in shape. At the base of each blade the metal is bent laterally to provide a flange 32 adapted to conform to the curvature of the cylinder 29, and the blades are secured on the cylinder by rivets or bolts passed through the blade flanges and through the metal walls of the cylinder. The blades are arranged on the cylinder in longitudinal rows, and also in rows circumferentially of the cylinder, there being preferably three blades in each longitudinal and in each circumferential row, at each side of the center of the cylinder. Each blade is disposed at an angle to the longitudinal axis of the cylinder, and blade A, for instance, in one row is disposed substantially in alinement longitudinally of the blade with blade B of the next following row, and blade B in turn is in substantial alinement with blade C of the row next following, so that blades A, B and C together form an interrupted spiral around the cylinder. The other blades are similarly arranged, with the result that the cylinder is equipped on its periphery with a plurality of interrupted spirals each formed by three blades of the three longitudinal rows. It will be obvious from Fig. 1 that the blades at opposite sides of the center of the cylinder are faced in opposite directions, so that when the cylinder is rotated in a clockwise direction viewing Fig. 3, the manure or fertilizer delivered by the delivery cylinder 17 will be engaged by the blades of the distributer, which is rotated from and in the same direction with the delivery cylinder 17 by a chain 33, and thrown rearwardly and laterally by the blades. In order to facilitate the lateral throwing action of the blades, each blade is slightly curved longitudinally, so that its rear or operating face 34 is slightly concave from front to rear.

It will be observed that each blade is of greatest depth at its rear edge, and that the long side of the triangle extending from the outer extremity of the blade to the base or flange 32 at its forward end is curved. This construction of the blade renders its operation quite different from the operation of the straight-edged, inclined paddles which have been used prior to my invention. The straight-edged paddles are designed to cut and break the manure by impact, but when the manure contains long marsh grass or corn stalks, this long grass or stalks is caught by the paddles and winds around the distributing device, thus detracting from its efficient operation. My present blades present no sharp or straight edges to the material being distributed, with the result that hay, straw, corn stalks, or other similar material, slides readily off from the blades and is thoroughly and evenly distributed without clinging to or winding about the distributer. The curved outer edges of the blades and the curved rear faces thereof both coöperate to permit the material to slide off the rear edges of the blades without clinging thereto, and my device is therefore particularly efficient in distributing manure containing long hay or stalks which could not be satisfactorily handled by the paddle distributers previously employed.

The machine is preferably equipped with the usual rake 35, which coöperates with the delivery cylinder 17 in disintegrating the material; and, if preferred, my machine may be also equipped with wings or guards 36, which direct the material rearwardly and prevent its becoming entangled in the wheels, particularly when a strong side wind is blowing.

It is believed that the construction and advantages of my improved distributing device will be understood from the foregoing without further description, and it should be obvious that the structural details disclosed are capable of considerable modification without departing from the scope of the invention.

I claim:

1. In a manure spreader, the combination of a delivery cylinder, a distributing device comprising a cylinder and a series of blades arranged spirally on the cylinder and curved from front to rear circumferentially of the cylinder, and means for operating said cylinders.

2. A distributing device for manure spreaders, comprising a rotating cylinder and a plurality of substantially triangular blades, each presenting a convex outer edge, a straight rear edge and a concave inner edge, said blades being attached along their inner edges to the periphery of the cylinder so as to be disposed in rows longitudinally of the cylinder and form interrupted spirals circumferentially of the cylinder.

3. A distributing device for manure spreaders, comprising a rotatable cylinder and a plurality of substantially triangular blades, each presenting a convex outer edge, a concave inner edge and a concave rear face, said blades being attached along their inner edges to the periphery of the cylinder so as to present interrupted spirals circumferentially of the cylinder.

4. A distributing device for manure spreaders comprising a cylinder, and a series of distributing blades arranged in spiral relation on the periphery of said cylinder, each of said blades presenting a curved outer edge increasing from front to rear in radial distance from the cylinder axis and a curved rear face.

5. A distributing device for manure spreaders comprising a cylinder provided on its periphery with a series of obliquely disposed blades, each blade having a concave rear working face and a curved outer edge.

6. A distributing device for manure spreaders, comprising a rotatable cylinder and a plurality of blades arranged thereon, each of said blades being constructed to present a smooth curved edge in the direction of travel, increasing in radial length from front to rear and also dished circumferentially of the cylinder to present a concave rear face to the material with which it comes in contact.

7. A distributing device for manure spreaders, comprising a rotatable cylinder provided on its periphery with a series of substantially triangular blades of maximum radial length at their rear ends, tapering in a curve to the periphery of the cylinder at their forward ends, said blades being secured along one edge to the periphery of the cylinder and arranged upon the cylinder obliquely to the axis thereof so as to present smooth edges to which the material will not cling, and inclined faces for distributing the material laterally.

CALVIN R. DAVIS.

Witnesses:
JOHN R. MAY,
R. H. SAVAGE.